United States Patent [19]
Russbült

[11] Patent Number: 5,032,030
[45] Date of Patent: Jul. 16, 1991

[54] APPARATUS FOR APPLYING INFORMATION TO PHOTOGRAPHIC MATERIALS AND THE LIKE

[76] Inventor: Gerald Russbült, Beim Andreasbrunnen 1, D-2000 Hamburg 20, Fed. Rep. of Germany

[21] Appl. No.: 142,308

[22] Filed: Dec. 28, 1987

Related U.S. Application Data

[63] Continuation of Ser. No. 899,957, Aug. 25, 1986, abandoned, which is a continuation-in-part of Ser. No. 613,954, May 24, 1984, abandoned.

[30] Foreign Application Priority Data

May 26, 1983 [DE] Fed. Rep. of Germany ....... 3319115

[51] Int. Cl.⁵ ................................................. B41J 3/36
[52] U.S. Cl. ..................................................... 400/88
[58] Field of Search ..................... 101/35; 400/88, 121, 400/124

[56] References Cited

U.S. PATENT DOCUMENTS

| | | | |
|---|---|---|---|
| 4,122,457 | 10/1978 | Erikson | 400/126 X |
| 4,143,382 | 3/1979 | Brill | 400/88 X |
| 4,217,820 | 8/1980 | Lorsch | 400/124 X |
| 4,255,061 | 3/1981 | Beery | 400/124 |
| 4,276,112 | 6/1981 | French | 101/35 X |
| 4,394,094 | 7/1983 | Simning | 101/35 X |

FOREIGN PATENT DOCUMENTS

| | | | |
|---|---|---|---|
| 10472 | 2/1981 | Japan | 400/88 |
| 2082509 | 3/1982 | United Kingdom | 400/88 |

Primary Examiner—Clifford D. Crowder
Attorney, Agent, or Firm—Peter K. Kontler

[57] ABSTRACT

A portable apparatus for applying information in the form of words, numerals and/or other characters to the frames of diapositives has a housing with a pocket which receives a frame to be provided with information. A stop arrests the frame in an optimum position for the application of information by an electronic printer of the type used in pocket-sized or table-model calculators. The printer is connected with a memory which can receive information for transmission to the printer, as well as with a display unit so that the person using the apparatus can observe the information which is about to be applied to a frame in the pocket. An electronically actuated transporting system is provided to introduce frames into, and/or to withdraw frames from, the pocket.

24 Claims, 2 Drawing Sheets

APPARATUS FOR APPLYING INFORMATION TO PHOTOGRAPHIC MATERIALS AND THE LIKE

This application is a continuation of application Ser. No. 899,957, filed Aug. 25, 1986, now abandoned, which is a continuation-in-part of Ser. No. 613,954, filed May 24, 1984, now abandoned.

BACKGROUND OF THE INVENTION

The present invention relates to apparatus for applying information to various sheet- or plate-like materials, especially for applying letters, numerals and/or other types of indicia to photographic materials such as diapositives, photographic prints and the like. More particularly, the invention relates to improvements in apparatus for applying information to sheet- or plate-like materials with an electronically operated applicator.

It is presently customary to identify various types of discrete photographic materials by hand, e.g., to inscribe information on the frames of diapositives or on the rear sides of photographic prints. It is also known to resort to labels on which the information is inscribed by hand and which are thereupon bonded to prints or diapositives. It is further known to apply information to such labels with a typewriter or a stamp.

In accordance with another earlier proposal, information is applied to the frames of diapositives by a specially designed typewriter. A drawback of such proposal is that the typewriter is big, unwieldy and not suitable for the application of information to other types of materials, i.e., the versatility of the typewriter is minimal so that it is too expensive for an amateur photographer or for a small shop dealing in photographic materials. Still further, the just discussed typewriter cannot accept all types of photographic material, e.g., large prints, because they cannot be inserted thereinto in proper position for reception of information in response to depression of selected keys.

In accordance with still another prior proposal, photographic material is supposed to receive information in a printer having sets of letters which can apply selected types of information in the form of words, groups of words, groups of numerals and the like. In other words, such printer constitutes a version of a stamp which can be used to apply the same information to each of a short or long series of photographic materials. A drawback of the printer is that its versatility is negligible because it takes too much time to change from one type of imprint to another e.g., to compose a different sentence for application to a given number of materials.

OBJECTS AND SUMMARY OF THE INVENTION

An object of the invention is to provide a novel and improved apparatus for the application of information to the frames of diapositives, to printing paper (such as photographic prints) and/or other sheet- or plate-like materials, and to construct and assemble the apparatus in such a way that it can apply identical information or different types of information to successive materials in a small area, with a small number of relatively simple and inexpensive components, and at a surprisingly high frequency.

Another object of the invention is to provide an information applying apparatus whose versatility greatly exceeds that of the aforediscussed conventional apparatus.

A further object of the invention is to provide an apparatus which is sufficiently inexpensive to be affordable by amateur photographers and which can apply information of desired nature to accurately selected portions of the frames of diapositives, of labels, of photographic prints and the like.

An additional object of the invention is to provide an apparatus which can memorize selected types of information for future application to photographic and like materials.

Another object of the invention is to provide a compact portable apparatus which is sufficiently small to be carried along, even in a pocket, for potential use by a photographer on a trip.

A further object of the invention is to provide the improved apparatus with novel means for properly locating selected materials in optimum positions for reception of information.

Still another object of the invention is to provide the apparatus with novel and improved means for ensuring the possibility of application of information to large, medium-sized or small objects with the same degree of predictability and accuracy.

A further object of the invention is to provide a novel and improved method of manipulating diapositives, photographic prints and like materials preparatory to and after application of information thereto.

The invention resides in an apparatus for applying information to sheet-like articles, especially photographic or other materials such as the frames of diapositives, photographic paper (e.g., short or long series of photographic prints) and/or labels which are to be attached to the frames of diapositives or photographic prints. The apparatus comprises an applicator having a printer, an adjustable receptacle for materials of different size, and means for locating a material in the receptacle in a fixed position relative to the printer. The applicator is preferably an electronic applicator and may, for example, function to apply information to a material not unlike a pocket size calculator applies information to a web of paper. The apparatus further comprises a memory which is connected with the printer and is advantageously also provided with means for displaying information which is about to be transmitted to the printer for application to a material.

In order to enhance the versatility of the apparatus, it can comprise means for separably connecting the applicator with the memory. This renders it possible to replace the applicator with another, e.g., a commercially available computerized applicator, when the latter is more suited for the application of information to selected types of materials. The applicator and the memory can be confined in the interior of a suitable housing (e.g., a small housing of the type used to accommodate a portable radio receiver), and the applicator may be designed to provide a material with information in the form of letters, numerals and/or other symbols, either individually or in groups of two or more to represent words, sentences, multiple-digit numbers or the like. The locating means is preferably arranged to maintain the material in the receptacle in a predetermined plane, and the applicator preferably comprises suitable means (e.g., a matrix printer, a spray printer or the like) for applying information to the material in such plane. The apparatus can further comprise means for transporting materials into and/or out of the receptacle, and such transporting means may constitute part of the locating means. The printer is preferably designed to apply information in a direction at least substantially at right angles to the aforementioned plane. The locating means can additionally comprise suitable guide means for guiding a material, e.g., the frame of a diapositive or a photographic print, in the course of advancement under the action of the transporting means. The guide means preferably extends in parallelism with the direction of movement of the material under the action of the transporting means. The guide means can be provided with at least one slot so that a portion of a relatively large sheet- or plate-like material can extend into the slot and out of the receptacle while another portion of the same material is in an optimum position for reception of information from the applicator.

The locating means can also include stop means for limiting the extent of introduction of a material into the interior of the receptacle. Such stop means can serve to properly locate a material in an optimum position for reception of information from the applicator. The stop means can constitute or form part of the bottom wall of the receptacle, and such bottom wall is disposed opposite and is spaced apart from an inlet for admission of material into the receptacle. The stop means can comprise a substantially U-shaped member whose web actually arrests the advancing material and whose flanges extend from the web in a direction toward the inlet to flank the leader of the introduced material. The bottom wall of the receptacle can be formed with a slot for the passage of material therethrough; this enables the transporting means of the apparatus to advance successive labels on a backing strip into the range of the applicator. The receptacle of the applicator can constitute a pocket which is provided in the housing for the applicator and the memory, and the top wall of such housing can be provided with an aperture which constitutes the aforementioned inlet of the receptacle. The top wall can be formed with at least one slot which communicates with the inlet and can receive a portion of a relatively wide or large sheet- or plate-like material while another portion of such material is located in the receptacle in the predetermined plane which is best suited for the application of information thereto. The slot of the top wall is preferably located in or close to such predetermined plane.

The transporting means for the materials can be actuated by electronic control means in response to depression of knobs, keys, buttons or the like at the front side of the housing. This enables the transporting means to advance successive materials to predetermined optimum positions with reference to the applicator. The transporting means can comprise at least one roller which is arranged to rotate about an axis that is at least substantially normal to the direction of advancement of materials under the action of the transporting means and parallel to the aforementioned plane of that portion of a material in the receptacle of the applicator which is about to receive information from the latter.

The locating means preferably further comprises means for biasing a material against properly positioned abutment means in the course of the application of information to such material. The abutment means may be constituted by the roller or rollers of the transporting means. The biasing means can comprise at least one roller or at least one plate-like member, and resilient means for yieldably urging the roller or plate-like member toward the abutment means. The transporting means is then designed to advance materials into the space between the abutment means and the biasing means. A manually operable lever or other suitable means can be provided to move the biasing means in a direction away from the abutment means in order to facilitate the introduction of a fresh material into the space between the abutment means and the biasing means.

The stop means is or can be disposed at a level below the inlet of the receptacle, and the biasing means then acts upon a material at an intermediate level above the stop means but below the inlet.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
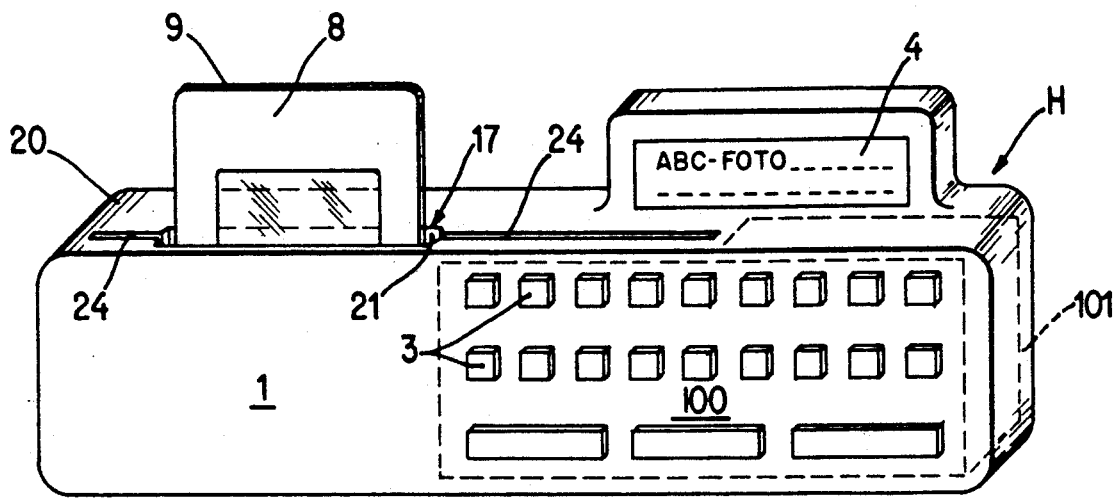
FIG. 1 is a perspective view of a portable apparatus which embodies one form of the invention and is shown in the process of applying information to the frame of a diapositive.

The apparatus which is shown in the drawings comprises an applicator 1, and a control section 100 for the applicator 1.

The control section 100 comprises a computer, as well as a memory 101 which is connected with the computer and the applicator 1. The computer is preferably user friendly, that is, preferably does not require special software for its operation, and is here assumed to be in the form of a conventional pocket-sized computer. The memory 101 is likewise assumed to be in the form of a conventional pocket-sized memory such as is employed in handheld or pocket-sized calculators. A pocket-sized computer suitable for use in the apparatus of the invention is manufactured by Sharp (model EL-7100 or EL-7100A).

The control section 100 further comprises a keyboard with several rows of depressible keys or buttons 3, as well as a display unit 4. The display unit 4 may, for example, be an LED display unit such as is found on handheld or pocket-sized calculators. The keyboard 3 may have a first portion in which the keys 3 represent letters and are arranged similarly to the keyboard of a typewriter, and a second portion in which the keys 3 are set up in a manner resembling the keyboard of a handheld or pocket-sized calculator. Among the keys 3 incorporated in the keyboard are a key 3 for storing information in the memory 101, a key 3 for retrieving information from the memory 101, and a key 3 for deleting information from the memory 101. The keyboard further comprises keys 3 for effecting transfer of information from the memory 101 to the applicator 1, for operating the applicator 1, and for causing the memory 101 to transmit stored information to the display unit 4 prior to application of such information to the frame 9 of a diapositive 8 in a receptacle or pocket 17 of the applicator 1. The exact manner in which the keys 3 effect introduction of information into the memory 101, withdrawal or deletion of information from the memory 101, transfer of information to the display unit 4, and transfer of information to the applicator 1, as well as initiation of the operation of the applicator 1, is not specifically shown because it can be the same as or analogous to the manner of manipulating information in a handheld or pocket-sized calculator.

The applicator 1 is here also assumed to be in the form of a conventional pocket-sized applicator such as is used in handheld or pocket-sized calculators. The applicator 1 comprises an electronic printer 2 which includes a carrier 5 having suitable elements for direct application of information to a selected portion of the frame 9 in the pocket 17. The information which is stored in the memory 101 can be used to enable the printer 2 to apply letters, numerals, groups of letters and/or numerals and/or other types of symbols. For example, each frame 9 can be provided with a short inscription pointing out the motif of the image on the respective diapositive 8, the date of taking the picture, the serial number of the diapositive in a series of diapositives which are ready for projection in the course of a lecture, and so forth. An advantage of the display unit 4 is that the user of the apparatus is in a position to inspect the information which is about to be applied to a frame 9 and to correct such information if necessary. The memory 101 can store bits of information which are used again and again and which may be combined with additional information or used exchangeably with additional information, depending on the nature of the materials which are being provided with imprints and on the nature of the information which is to be applied to the materials.

The printer 2 is operatively connected with the computer of the control section 100. The connection between this computer and the printer 2 may be similar to that between the computer and printer in a handheld or pocket-sized calculator.

The dimensions of the entire apparatus need not exceed those of the apparatus which is shown in FIG. 1, i.e., the entire apparatus may be small enough to be held in the hand or carried along in a pocket. The apparatus may be powered by one or more batteries of the type employed in handheld or pocket-sized calculators, and such batteries are preferably rechargeable.

The memory 101 can comprise several discrete information storing units, and the information which is stored in such units can be displayed in response to depression of selected keys 3 prior to depression of that key which effects the transfer of displayed information to the applicator 1 so that the printer 2 of this applicator can apply the displayed information to a selected portion of the frame 9 in the pocket 17. The individual storing units can memorize information which recurs at frequent or reasonably frequent intervals so that such information need not be assembled bit-by-bit prior to its application to a frame 9. The information which is stored in one or more discrete storing units can be combined for joint transmission to the applicator 1 and subsequent application to the frame 9 in the pocket 17.

The printer 2 may be a compact, high-speed mosaic or matrix printer, such as the EPSON-miniprinter M-160, which forms bits of information by applying dots. Alternatively, the printer 2 may be of the type which burns or singes selected portions of the frame 9 in the pocket 17 to thus apply information in the form of dots, letters, numerals and/or other characters. The printer 2 may also be a so-called spray printer which propels dots of liquid coloring matter onto selected portions of the frame 9 in the pocket 17. It is further possible to employ a printer which applies letters and numerals in a conventional way, not unlike a typewriter.

Figure 2:
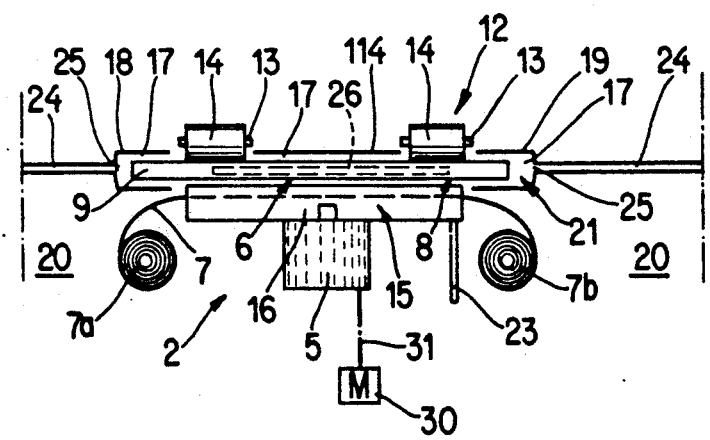
FIG. 2 is a fragmentary plan view of the apparatus with the housing removed so as to expose the applicator.

The carrier 5 of the printer 2 is disposed in front of a predetermined plane 6, namely, the plane of that portion of the frame 9 which is properly received in the pocket 17 of the applicator 1. Depending upon the nature of the printer 2 and the information to be applied to the frame 9, it may be necessary to move the carrier 5 relative to the frame 9 To this end, the carrier 5 may be coupled to a drive unit which allows the carrier 5 to be shifted relative to the frame 9 along one or more predetermined directions, e.g., horizontally and/or vertically. As illustrated in FIG. 2, the drive unit comprises at least one battery-operated motor 30, and a connection 31 between the motor 30 and the carrier 5. The motor 30 may resemble the motors which are used to drive the tapes in handheld or pocket-sized calculators and may be activated in response to depression of one of the keys 3 on the keyboard of the control section 100.

Depending upon the nature of the printer 2, a ribbon 7 may extend between the carrier 5 and the plane 6 of the frame 9 to be located in the path of movement of the information applying elements on the carrier 5. The manner in which successive increments of the ribbon 7 are transported from a supply reel 7a to a takeup reel 7b is not specifically shown in the drawings but may be readily accomplished via a battery-operated motor of the type found in handheld or pocket-sized calculators, and a linkage for alternately connecting the reels 7a,7b with the motor. The EPSON-miniprinter M-160, for instance, has reels integrated in its motor. The ribbon 7 can be red, black or any other suitable color.

Figure 3:
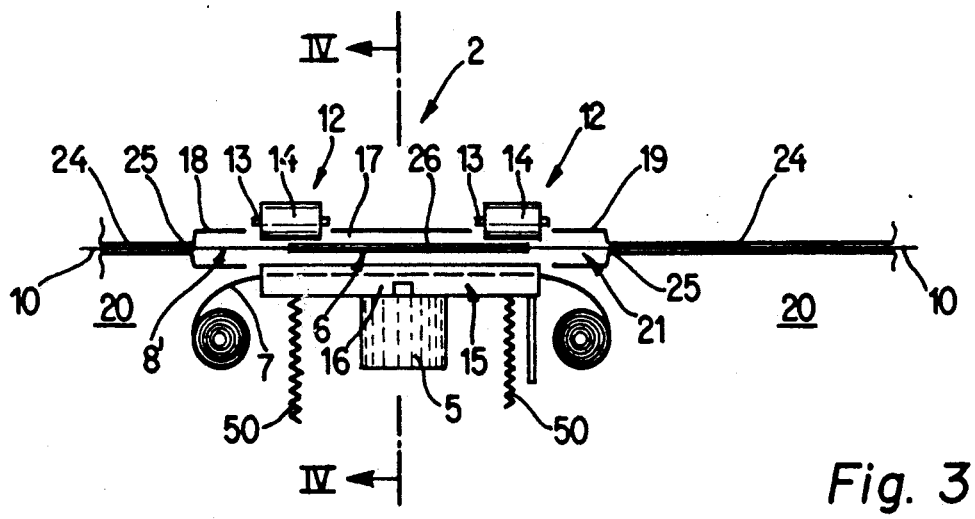
FIG. 3 illustrates the structure of FIG. 2 but with a piece of photographic paper in a position to receive information from the applicator.
Figure 4:
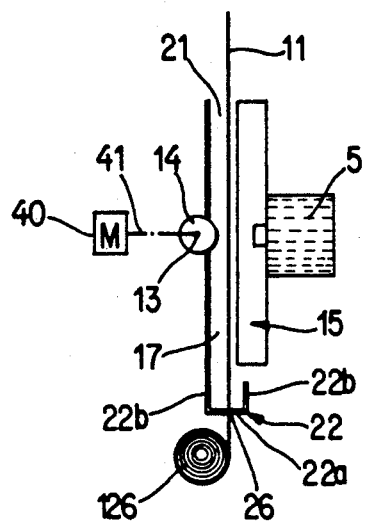
FIG. 4 is a sectional view as seen in the direction of arrows from the line IV—IV of FIG. 3, showing one of a series of labels in the process of receiving information from the printer of the applicator.

The versatility of the improved apparatus will be appreciated by comparing FIGS. 2, 3 and 4. In FIG. 3, the apparatus is in the process of applying information to a photographic print 10, i.e., to a portion of a web 8' of photographic paper. In FIG. 4, the apparatus is in the process of applying information to one label 11 of a strip of coherent labels or to one label of a series of discrete labels which are carried by a suitable backing strip. The reasons for such pronounced versatility of the improved apparatus will be explained below.

The applicator 1 further comprises a transporting unit 12 which preferably comprises a pair of electrically driven rollers 14 having shafts 13 whose axes are parallel to the plane 6 and extend at right angles to the direction of transport of frames 9, prints 10 and labels 11 into and from the pocket 17. Such direction extends at right angles to the plane of FIG. 2 or 3 and vertically as viewed in FIG. 4. The printer 2 is designed to apply information at right angles to the plane 6.

As shown in FIG. 4, the rollers 14 are driven by a battery-operated motor 40 which is connected with the shafts 13 via a linkage 41 and may again resemble the motors used to drive the tapes in handheld or pocket-sized calculators. The motor 40 may be electronically controlled in such a way that a frame 9, print 10 or label 11 is brought to a halt in a predetermined position which is best suited for the application of information to a selected portion thereof in the pocket 17. Alternatively, the motor 40 may be designed a stepping motor which properly positions a frame 9, a print 10 or label 11 in front of the carrier 5 by advancing the frame 9, print 10 or label 11 through a predetermined distance in response to insertion of the same in the pocket 17 or in response to depression of a key 3. Other means are also provided to assist the transporting unit 12 in properly locating successive frames 9, prints 10 or labels 11 in front of the carrier 5 of the printer 2. Such proper positioning of materials to be provided with imprints in predetermined positions relative to the printer 2 not only ensures the making of readily discernible imprints but also the application of imprints to predetermined portions of each of a short or long series of selected photographic materials.

In the illustrated embodiment of the improved apparatus, the rollers 14 of the transporting unit 12 are disposed at one side and the carrier 5 of information applying elements is disposed at the other side of the plane 6 for the frame 9, print 10 or labels 11. However, it is equally within the purview of the invention to place the rollers 14 at the front side of the plane 6, i.e., so that these rollers flank the carrier 5 and are in a position to engage that side of a selected material which faces the printer 2.

In the apparatus of FIGS. 1 to 4, the rollers 14 of the transporting unit 12 together constitute an abutment for the material 9, 10 or 11 in the pocket 17 of the applicator 1. A biasing member 15 is provided at the opposite side of the plane 6 to urge the material 9, 10 or 11 in the pocket 17 against such abutment and to thus further ensure that the material is located in the plane 6 at the time it receives information from the elements of the carrier 5 via the ribbon 7. The biasing member 15 is yieldably urged towards the rollers 14 by resilient elements 50 which are shown in FIG. 3 and may, for example, take the form of coil springs or leaf springs. The resilient elements 50 may react against a wall of the apparatus including the applicator 1 and the control section 100.

The biasing member 15 here includes a plate-like portion 16 which is parallel to the plane 6. Alternatively, the biasing member 15 can be replaced with a biasing member having a set of rollers or spheres which engage the front side of the material 9, 10 or 11 in the pocket 17 and urge it against the rollers 14 of the transporting unit 12 or against other suitable abutment means (shown at 114) behind the plane 6. If the biasing member utilizes rollers, the axes of such rollers are preferably parallel to those of the rollers 14.

The pocket 17 includes lateral guides 18, 19 which guide the frame 9 during introduction into and/or during expulsion from the interior of the pocket. Such guides extend in parallelism with the direction of advancement of materials into and from the pocket 17, i.e., at right angles to the plane of FIG. 2 or 3. The distance between the guides 18, 19 is selected with a view to ensure convenient entry of a frame 9 into the pocket 17 but to prevent tilting and jamming of the introduced frame 9. Improper orientation of a frame 9 in the pocket 17 could result in the application of illegible information and/or in the application of information to the wrong portion of the frame 9.

In the apparatus of FIGS. 1–4, the applicator 1 and control section 100 are accommodated in a common housing H. The housing H is here assumed to have a size such that it can be held in the hand or inserted in a pocket. The top wall 20 of the housing H has an aperture 21 which is the inlet of the pocket 17 and is remote from a U-shaped bottom wall 22 of the pocket. The inlet 21 is a relatively wide slot which allows for unimpeded insertion of a properly oriented frame 9 but without excessive wobbling relative to the plane 6. The web 22a of the bottom wall 22 of the pocket 17 constitutes a stop which arrests the leading edge of an inserted frame 9 in requisite position for the application of information to a selected portion of the inserted frame. The flanges 22b of the bottom wall 22 extend from the web 22a toward the inlet 21 and serve to flank the front and rear sides of the inserted leader of the frame 9 in order to assist in retention of the frame 9 in the plane 6 during application of information thereto. Thus, the flanges 22b of the bottom wall 22 cooperate with the biasing member 15 and rollers 14 of the transporting unit 12, as well as with the lateral guides 18, 19 of the pocket 17, to properly locate the inserted frame 9 in the interior of the housing H preparatory to and during the application of information.

In order to facilitate the introduction of frames 9 into the space between the rollers 14 and the plate 16 of the biasing member 15, the latter is preferably movable away from the rollers 14, i.e., away from the plane 6, in response to manual actuation of a retracting lever 23 which extends from the housing H but is not shown in FIG. 1 because it constitutes an optional feature of the improved apparatus. The operator can exert a pull upon the lever 23 in order to draw the plate 16 away from the plane 6 and from the rollers 14 of the transporting unit 12. The width of the gap between the rollers 14 and the plate 16, when the biasing member 15 is held in the retracted position by means of the lever 23, can be sufficient to allow for gravitational descent of the frame 9 into the pocket 17 and into abutment with the centrally located web 22a of the bottom wall 22 so that the transporting unit 12 need not be started for the purpose of introducing a frame 9 into the interior of the housing H. The motor 40 for the rollers 14 is preferably reversible so that a freshly imprinted frame 9 can be readily expelled from the pocket 17 by moving it upwardly, as viewed in FIG. 1.

The top wall 20 of the housing H is further formed with two relatively narrow slots 24 which communicate with the inlet 21 and are disposed in or parallel and close to the printing plane 6. The purpose of the slots 24 is to allow for introduction of relatively wide materials, such as the print 10 of FIG. 3 whose width greatly exceeds the distance between the lateral guides 18, 19 of the pocket 17. The guides 18, 19 are provided with slots 25 which register with the slots 24 in the top wall 20 and ensure that the relatively wide print 10 of FIG. 3 can be introduced all the way into contact with the centrally located web 22a of the U-shaped bottom wall 22 of the pocket 17. The mode of inserting the print 10 is preferably such that the rear side of the properly inserted print faces the carrier 5 of the printer 2. This saves a label which is normally used to receive information prior to being affixed to the rear side of a photographic print. The web 22a of the bottom wall 22 of the pocket 17 can be provided with a slot 26 (see FIG. 4) so that a strip of labels 11 can be introduced into the pocket 17 from below and moved stepwise upwardly in order to place successive labels 11 in front of the carrier 5 of information applying elements. The strip of labels 11 can be inserted into the housing H in the form of a roll 126 (shown in the lower part of FIG. 4) and its leader is then threaded through the slot 26 of the bottom wall 22 and upwardly into the range of the rollers 14 to be advanced by a step in response to depression of a selected key 3 which controls the operation of the motor 40 for the rollers 14. Successive imprinted labels 11 emerge from the housing H via inlet 21 and can be detached from the strip for attachment to the rear sides of successive frames 9, prints 10 or the like.

The operator can recall certain often used information from the memory 101 for display at 4 prior to application to a material 9, 10 or 11 in the pocket 17. For example, such information can include a certain year, a certain month, the type of film which was used to make a diapositive or negative, the photographer and/or other data. The information which has been recalled from storage can be combined with additional (fresh) information in response to depression of appropriate keys 3, and the combined information is preferably displayed at 4 for inspection by the operator or to actual application to the material 9, 10 or 11 (or any other suitable sheet- or plate-like material) in the pocket 17. The arrangement is or can be such that the printer 2 cannot be started when the pocket 17 is empty or when the pocket does not receive a properly introduced and-/or oriented material. For example, the leader of a frame 9 or print 10 may be required to abut against the web 22a of the bottom wall 22 before the printer 2 can be started to initiate the application of information by the elements of the carrier 5.

The aforedescribed versatility of the improved apparatus is desirable irrespective of whether the apparatus is used by an amateur photographer or by a professional. For example, the apparatus can be used in the laboratory of a professional photographer, dealer or film processing organization for rapid and predictable identification of successive prints, diapositives or the like. In such institutions, the versatility of the improved apparatus is particularly beneficial due to the fact that it is often necessary to process a number of differently dimensioned slides, photographs, negatives or the like.

The printer 2 may be a commercially available printer which, in the apparatus of FIGS. 1-4, is combined with a control section 100 having a suitable memory 101 for storage of certain types of information. Alternatively, the printer 2 and control section 100 may be replaced by a commercially available printer which already embodies a computer and a suitable memory for the storage of requisite quantities of data denoting sequences of letters, numerals and/or other characters. The configuration and dimensions of the housing H will conform to the dimensions and shapes of the applicator 1 and control section 100.

Figure 5:
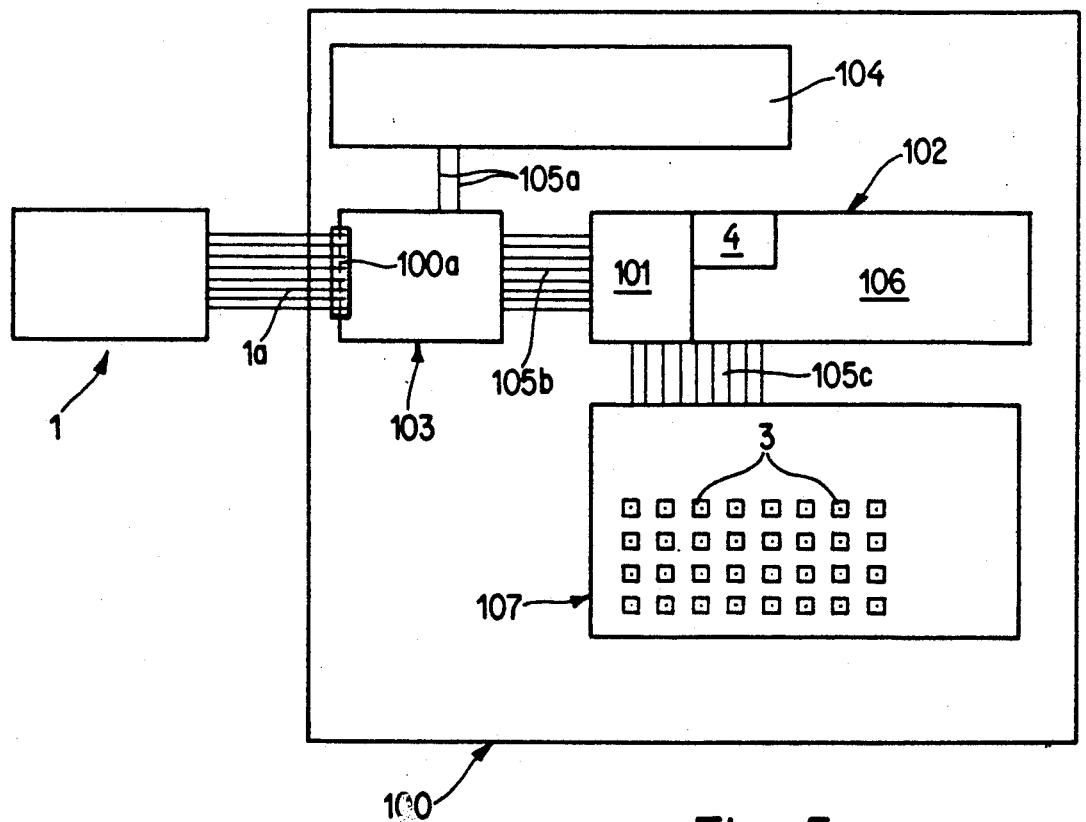
FIG. 5 diagrammatically illustrates another embodiment of the apparatus.

The control section 100 can be separably connected with the applicator 1 so that the two components of the apparatus can be separated from one another in order to couple the control section 100 with a different, e.g., a simpler or a more sophisticated, applicator. The applicator 1 and control section 100 can be separably coupled to one another by resorting to insertable contact strips or the like. As illustrated in FIG. 5, it is further possible to separably couple an applicator and a control section via plug-and-socket type connections.

In FIG. 5, the same reference numerals as in FIGS. 1-4 are used to identify similar elements. FIG. 5 shows that the control section 100 comprises a computing and control assembly 102 which includes the memory 101, the display unit 4, and a computer 106. The control section 100 further comprises an interface 103 as well as one or more batteries 104. The batteries 104 are connected to the interface 103 via conductors 105a, and the interface 103, in turn, is connected to the computing and control assembly 102 by means of conductors 105b. Additional conductors 105c connect the computing and control assembly 102 with the keyboard which is here generally identified by the reference numeral 107.

The interface 103 is provided with a series of sockets 100a. The applicator 1, on the other hand, has a set of plugs 1a which are receivable in the sockets 100a. The applicator 1 may thus be readily disconnected from the control section 100 by pulling the plugs 1a out of the sockets 100a. Similarly, the applicator 1 may be connected with the control section 100 without difficulty by inserting the plugs 1a in the sockets 100a.

An important advantage of the improved apparatus is its simplicity as well as its compactness, reasonable cost and especially its versatility. Moreover, the assembly of requisite data for application to a material in the pocket 17 takes up little time, especially if the information which is to be applied includes bits of information which are applied regularly or frequently so that it is worthwhile to store such bits of information in the memory 101 and to transmit the stored bits to the applicator 1, either alone or in combination with freshly added information. This saves time to the user and reduces the likelihood of improper assembly of data for application to the material in the pocket 17. Still further, the ability of the apparatus to store certain types of information renders its manipulation less tedious because the user is not called upon to repeatedly assemble the same bits of information into words, sentences or the like. Changes in certain types of stored information can be carried out with little loss in time, i.e., in response to depression of appropriate keys 3.

The apparatus can apply information to relatively thick plate-like materials, e.g., to the frames of diapositives wherein the frame thickness is in the range of up to 2 mm, as well as to thin or extremely thin sheets of paper or the like, such as strips of labels, webs or discrete portions of photographic paper, strips of paper which are used in pocket-type calculators and/or other sheet-like materials.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for applying information to a frame for a diapositive, comprising means for locating the frame in a predetermined position, said locating means including a pocket having a width which approximates the width of the frame, and said pocket having an inlet end and another end opposite said inlet end, said locating means further including a stop at said other end; a printer including a printing head movable transversely of said pocket along a substantially straight line; and a memory connected with said printer.

2. The apparatus of claim 1, comprising means separably connecting said printer with said memory.

3. The apparatus of claim 1, comprising a computer which is connected with said memory and said printer.

4. The apparatus of claim 1, wherein said printer is electronically controlled.

5. The apparatus of claim 1, comprising means for displaying information stored in said memory.

6. The apparatus of claim 1, wherein said locating means maintains the frame in a predetermined plane.

7. The apparatus of claim 6, wherein said locating means comprises means for transporting the frame with reference to said pocket.

8. The apparatus of claim 7, wherein said locating means comprises guide means for guiding the frame in the course of advancement under the action of said transporting means.

9. The apparatus of claim 8, wherein said transporting means advances the frame in a predetermined direction and said guide means extends in substantial parallelism with said direction.

10. The apparatus of claim 1, wherein said stop includes a bottom wall of said pocket.

11. The apparatus of claim 1, wherein said stop includes a substantially U-shaped member.

12. The apparatus of claim 11, wherein said U-shaped member has a web, and a pair of flanges flanking said web and extending from said web in a direction towards said inlet end.

13. The apparatus of claim 1, comprising a housing for said printer, said pocket being provided in said housing.

14. The apparatus of claim 1, wherein said locating means comprises means for transporting the frame with reference to said pocket, and electronic control means for said transporting means.

15. The apparatus of claim 1, wherein said locating means maintains the frame in a predetermined plane, said locating means including means for transporting articles with reference to said pocket in a predetermined direction, and said transporting means comprising at least one roller rotatable about an axis which is substantially normal to said direction and substantially parallel to said plane.

16. The apparatus of claim 1, wherein said locating means comprises abutment means, and means for biasing the frame against said abutment means.

17. The apparatus of claim 16, wherein said biasing means includes at least one roller, and resilient means for urging said roller towards said abutment means.

18. The apparatus of claim 16, wherein said biasing means includes a plate-like member, and means for yieldably urging said member towards said abutment means.

19. The apparatus of claim 16, wherein said abutment means comprises means for transporting the frame with reference to said pocket.

20. The apparatus of claim 16, comprising means for moving said biasing means away from said abutment means.

21. The apparatus of claim 20, wherein said moving means comprises a manually operable lever.

22. The apparatus of claim 16, comprising a housing for said printer, said pocket being provided in said housing, and said inlet end being disposed at a level above said stop, said biasing means acting between said inlet end and said stop.

23. The apparatus of claim 1, comprising a computer which is connected with said memory and said printer; and wherein said computer, said memory and said printer are all pocket-sized.

24. The apparatus of claim 1, comprising means for entering information in said memory, and means for displaying information.

* * * * *